April 16, 1968  J. A. PINCHEV  3,377,797
AUTOMATIC DISASSEMBLING MACHINE FOR RIVETED
ROLLER CHAIN PIN LINKS
Filed Oct. 29, 1964  5 Sheets-Sheet 1

INVENTOR.
JULIUS A. PINCHEV

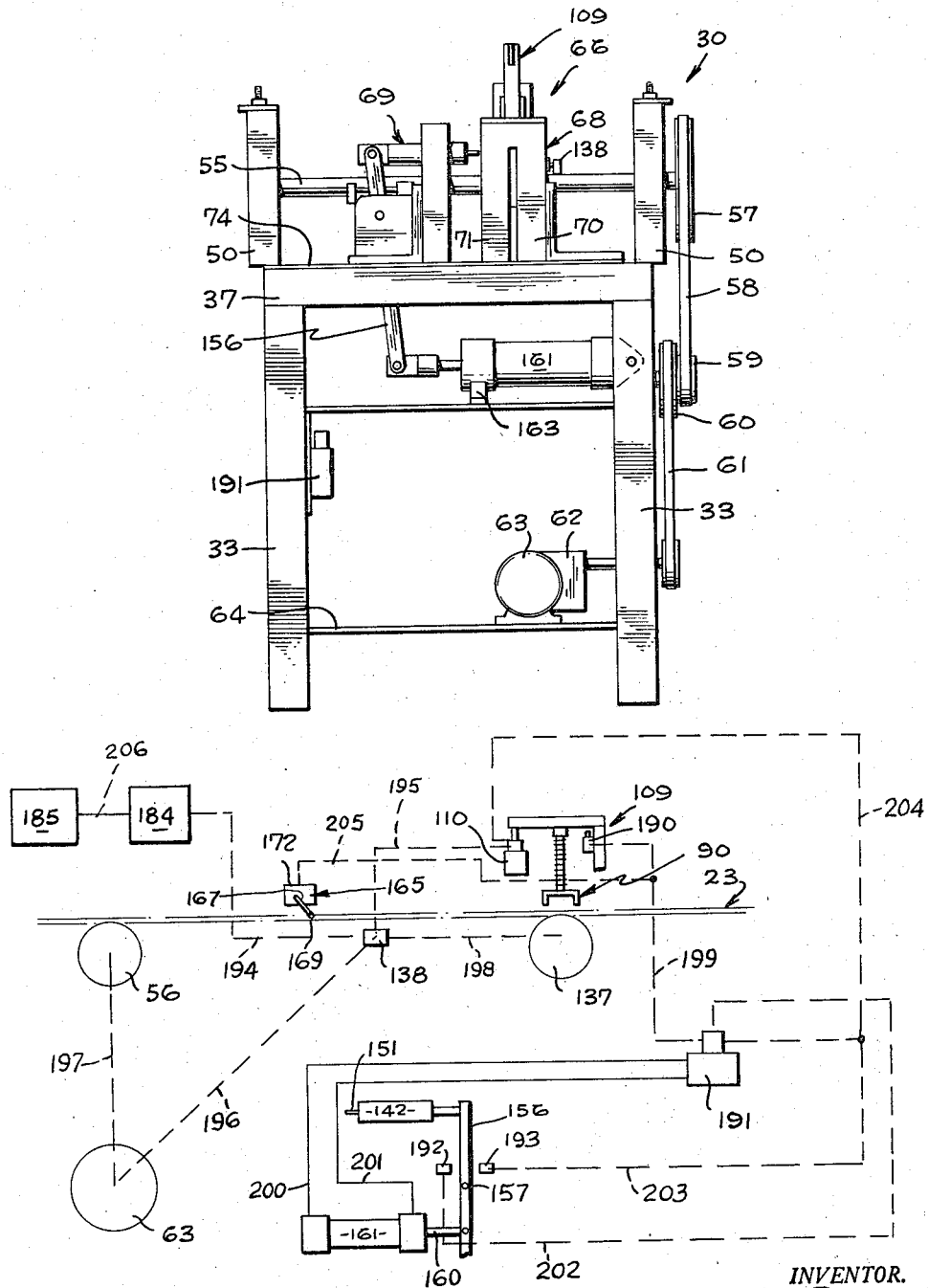

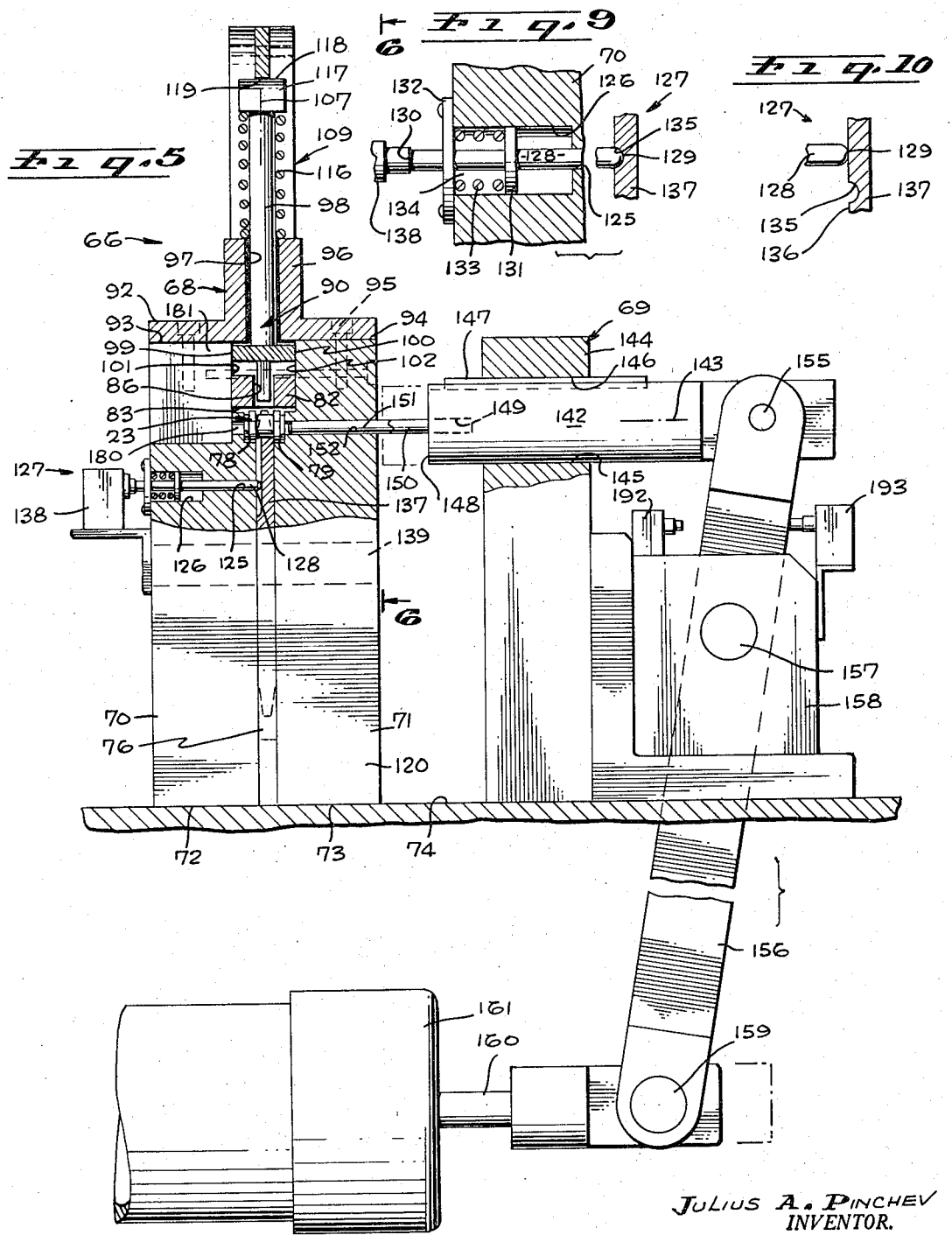

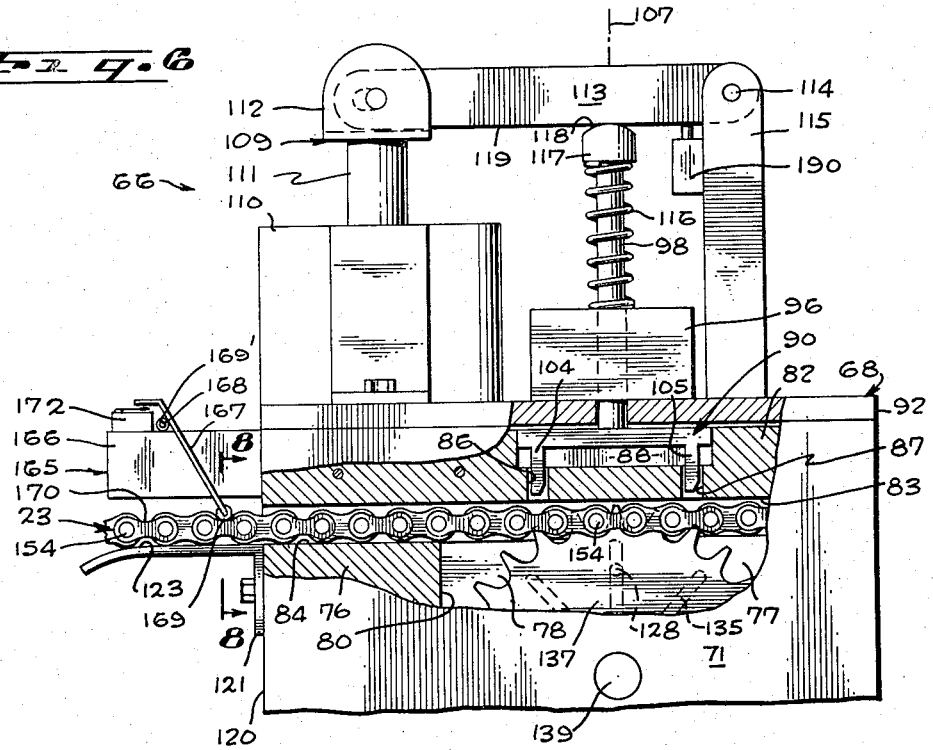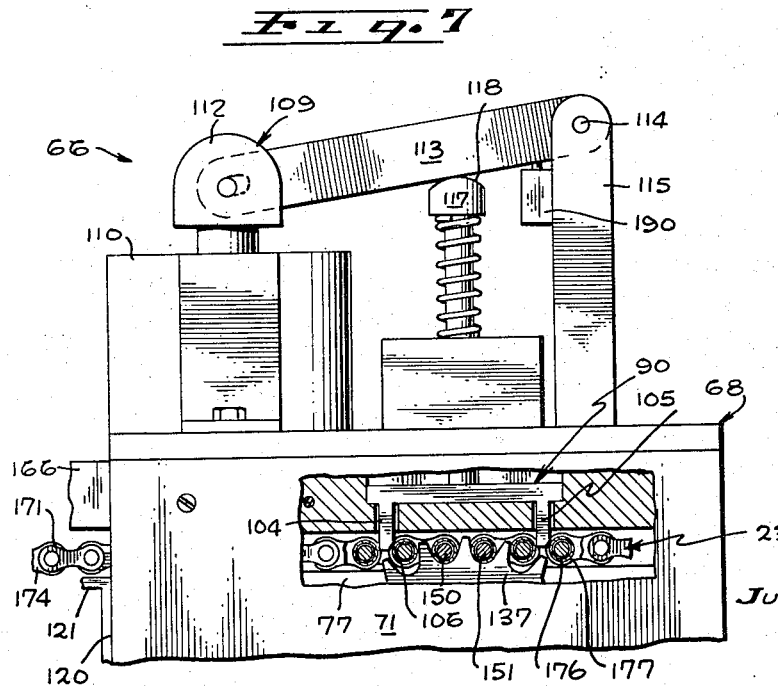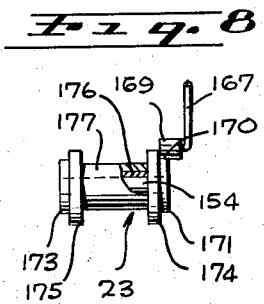

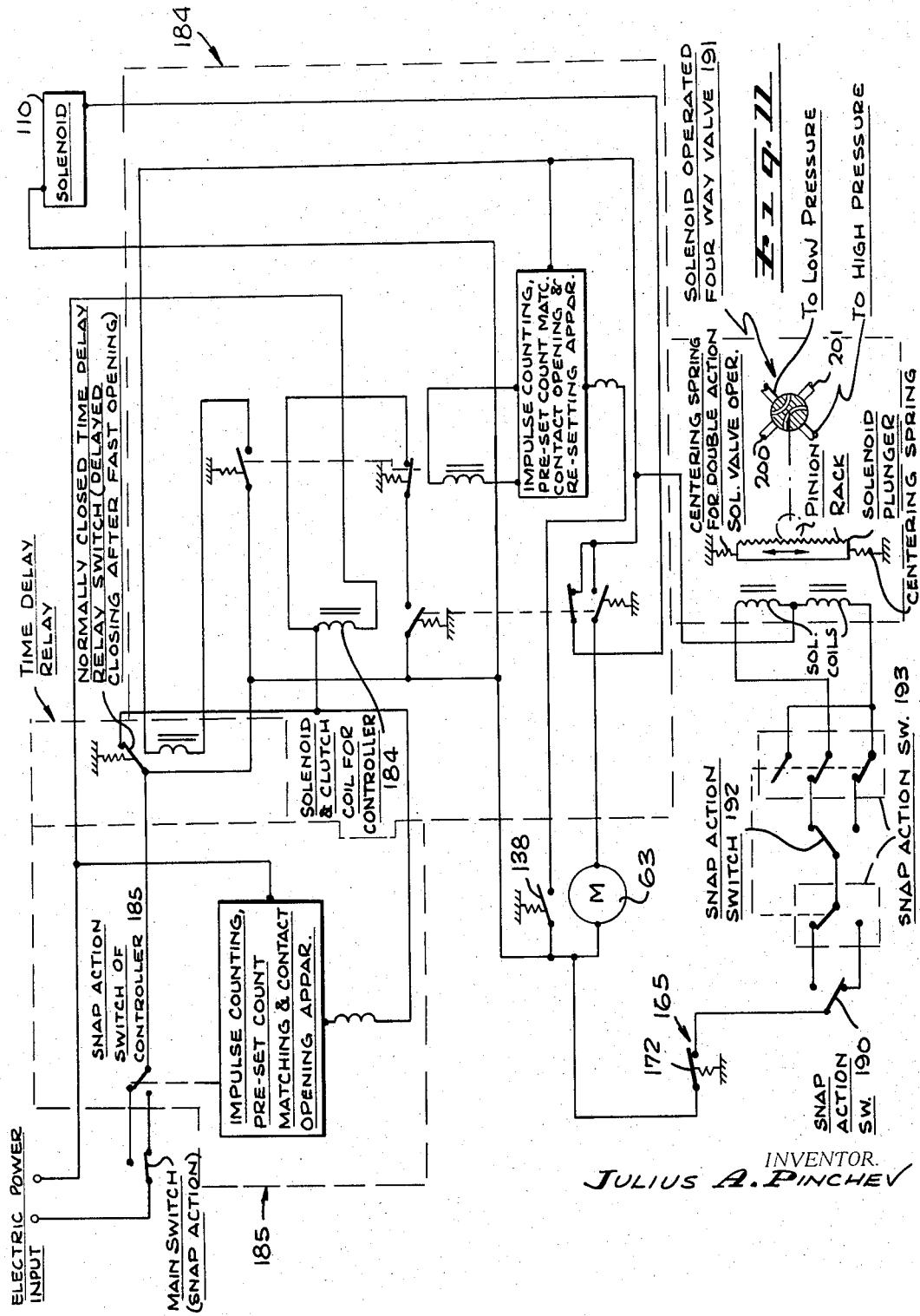

United States Patent Office 3,377,797
Patented Apr. 16, 1968

3,377,797
AUTOMATIC DISASSEMBLING MACHINE FOR RIVETED ROLLER CHAIN PIN LINKS
Julius A. Pinchev, Los Angeles, Calif.
(3225 E. 34th St., Tulsa, Okla. 74105)
Filed Oct. 29, 1964, Ser. No. 407,380
2 Claims. (Cl. 59—7)

ABSTRACT OF THE DISCLOSURE

A machine for automatically disassembling riveted roller chain links at any position along a length of such roller chain whereby to separate it into shorter portions having the selected number of links therein. The chain is fed through a transverse positioning aperture and over a sprocket located therein, and a counter counts the number of links which pass through the positioning aperture at the punch-out location. The chain is locked into an aligned position so that the corresponding rivets can be laterally struck out by a pair of punch-out pins. If precise alignment with the rivets is not achieved, a sensing means inactivates the punch-out actuator until alignment is achieved. A second counter counts the number of chain lengths separated from the main feed chain until the number of separated chain lengths corresponds to an initial setting, then automatically stops further operation of the apparatus until again reset and restarted.

---

This invention relates to a machine automatically disassembling riveted roller chain from a large roll of indefinite length as assembled by manufacturers.

This invention relates to a more efficient method to the existing manually operated roller chain disassembling machines, a slow and inefficient device.

It is another object of this invention to provide an improved automatic machine that would count-off accurately a predetermined number of roller chain links and disassemble or punch out the riveted pins and repeat its operation.

It is another object of this invention to provide an improved automatic machine that would count-off accurately a predetermined number of lengths of roller chain with the correct number of links and automatically stop operation.

Figure 1:
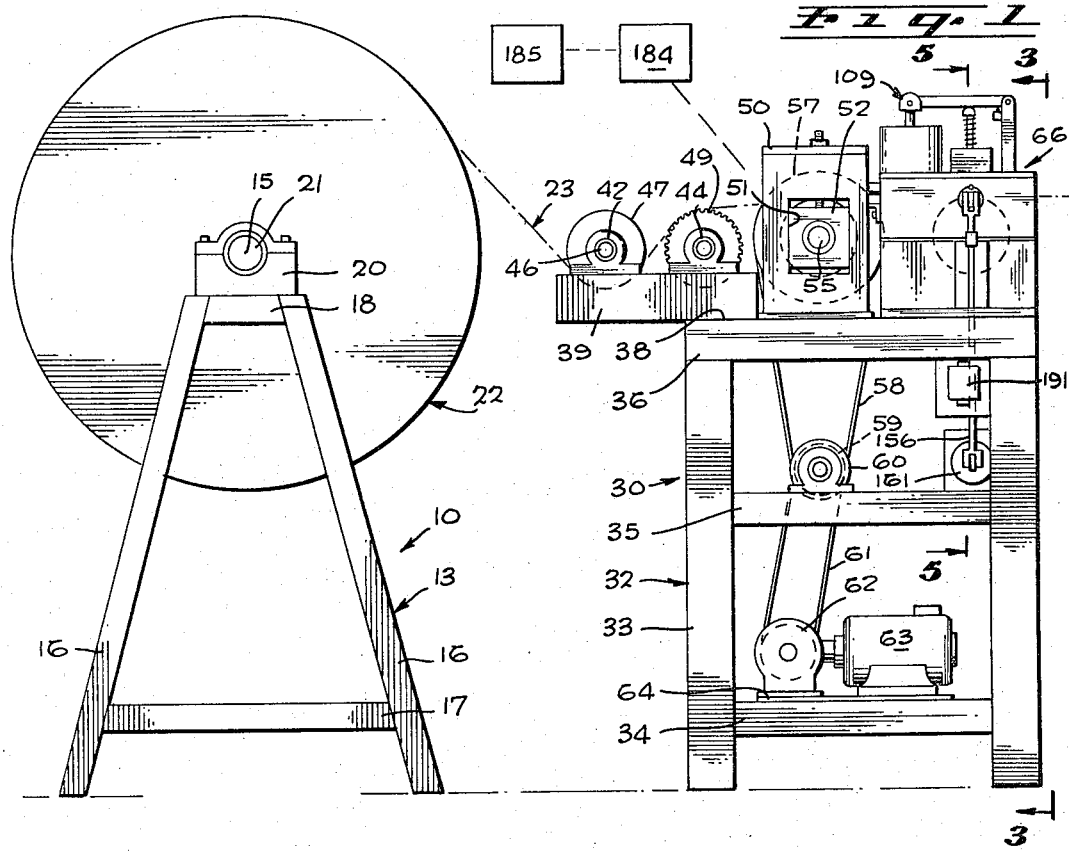
Figure 2:
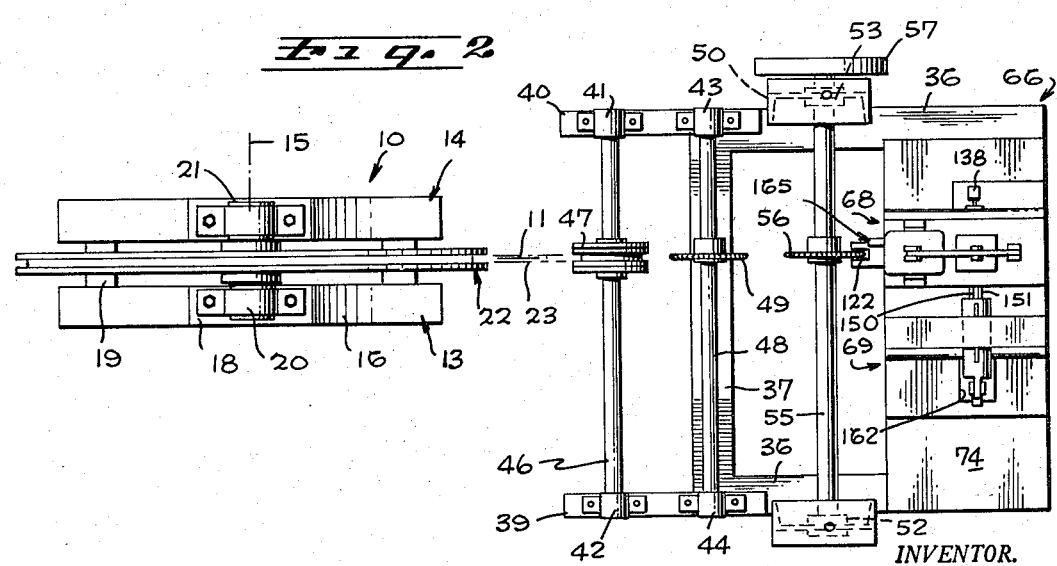

In the drawings which illustrate the invention.
Referring to the drawings:
FIG. 1 is a side elevational view of my apparatus;
FIG. 2 is a top plan view;
FIG. 3 is an end elevation on line 3—3 of FIG. 1;
FIG. 4 is a schematic representation of the apparatus;
FIG. 5 is a view, partly in section, taken on line 5—5 of FIG. 1;
FIG. 6 is a side elevational view of the device, partly broken away, taken on line 6—6 of FIG. 5.
FIG. 7 is a view similar to FIG. 6 but with the mechanism shown in another position;
FIG. 8 is a cross-sectional view on line 8—8 of FIG. 6;
FIG. 9 is an enlarged longitudinal fragmentary view of a portion of my device;
FIG. 10 is an enlarged fragmentary view of a portion of my device illustrated in FIG. 9, but in a modified operational position.

More particularly, describing the invention, numerals 10 and 30 designate a chain reel support structure and punching apparatus respectively, disposed in longitudinal alignment along axis 11. The chain reel support 10 comprises two generally A-frame members 13 and 14, aligned in space relationship along axis 15. The A-frame typically comprise support legs 16 and brace members 17 and 18, with horizontally disposed cross brace members 19 interconnecting the two A-frames. Brace member 18 has mounted thereon a bearing block 20, in which is received a shaft 21 of chain spool assembly 22, upon which a substantial length of roller chain 23 is mounted. The chain spool assembly is of conventional structure and need not be further described.

With reference to the indexing and punching assembly 30, this comprises a support frame 32, consisting of vertical legs 33 and horizontally disposed brace members 34 and 35. Top members 36 and interconnecting members 37 complete the basic frame. Top surface 38 carries extension members 39 and 40, upon which is mounted bearing blocks 41, 42, 43 and 44. Bearings 41 and 42 receive a shaft 46 which, in turn, mounts a guide sheave 47, while bearings 43 and 44 receive shaft 48, carrying idler sprocket 49 over which chain 23 passes. Top surface 38 also carries bearing support members 50, which may suitably comprise a channel shaped structural member having a rectangular cut-out 51 to adjustably receive bearing blocks 52 and 53, which, in turn, receive drive shaft 55. Vertical adjustment of the drive shaft can be achieved in any conventional manner—for example, a vertically extending screwed spindle and nut assembly. Removably mounted on drive shaft 55 is drive sprocket 56 and driving pulley 57. The drive shaft is driven through pulley 57, belt 58, sheave 59, reducing sprocket 60, belt 61, gear reducer 62 and motor 63. Motor and gear reducer are both mounted on a platform 64 supported on horizontal brace 34. Guide sheave 47, idler sprocket 49 and drive sprocket 56 are all interchangeable on their respective shafts, so that any size of idler chain may be handled by the apparatus. Also mounted on top surface 38 of support frame 30 is what shall generally be termed a die housing and punch assembly 66. More fully illustrated in FIGS. 5–10.

With reference to FIG. 5, numeral 68 will refer to a die housing assembly, and numeral 69, the punch assembly. The die housing assembly essentially comprises two substantially thick side plates 70 and 71, having lower surfaces 72 and 73 respectively, which are, in turn, supported on platform 74 mounted on top surface 38 of frame assembly 30. A spacer 76 maintains side plates 70 and 71 in spaced but connected relationship, and is so shaped as to define a chamber 77 having side walls 78 and 79 and end wall 80. A spacer 82 has a bottom 83 which forms the top wall of the chamber 77. Side walls 78 and 79, bottom wall 83 of spacer 82, and top surface 84 of spacer 76 define a generally rectangular aperture through which the roller chain passes, and by virtue of which is restrained from side movement or appreciable vertical movement. Apertures 86 and 87 are located in horizontally spaced relationship in a vertical plane in spacer 82, which also is recessed at 88 to receive a plunger assembly 90. A top plate 92 is bolted to the top surfaces 93 and 94 of side plates 70 and 71 respectively by means of set screws 95. An integrally mounted boss 96 contains a bore 97 to receive a plunger 98 in sliding relationship. The plunger head is restrained from misalignment by the vertically sliding relationship of surfaces 99 and 100, and side walls 101 and 102. Vertically disposed downwardly from plunger plate 103 are locating fingers 104 and 105. These are preferably of rectangular shape having a tapered end surface 106. Plunger assembly 90 is actuated in the vertical direction along axis 107 by a solenoid actuating assembly 109, which comprises a conventional solenoid 110 having a plunger 111, which mounts a bifurcated boss 112 at its outer end, and which, in turn, pivotally receives a link 113 pivotally mounted at 114 on support bracket 115. Plunger 98 is spring-urged by virtue of spring 116 acting against the top surface of boss 96 and undersurface of boss 117. Boss 117 has an arcuate upper surface 118 to maintain contact with under surface 119 of link 113. Also including as part of the punch assembly 66 and mounted on end walls 120 of side plates 70 and 71 is a support bracket 121 bifurcated at 122, to allow rotational movement of sprocket 56.

Top surfare 123 acts as a support for the chain to prevent misalignment. Side plates 70 contain a bore 125 and counter-bore 126 for receiving an indexing assembly 127. Indexing assembly comprises a plunger 128, having a rounded inner end 129 and a transverse outer end 130. A flange 131 is securely connected to plunger 128 and this flange together with cover plate 132 restricts a spring 133 contained in the recess 134 therebetween to axial movement to alternately urge end 129 of plunger 128 into and alternately out of axially extending grooves 135 formed in face 136 of indexing sprocket 137, while the outer end 130 actuates a microswitch 138.

With particular reference to indexing sprocket 137, this is mounted on a shaft 139 transversely to the axis of the direction of flow of the chain. The sprocket is of a conventional nature, having circumferentially spaced teeth to mate, with the pitch of the roller chain being processed, with the exception of the aforementioned radially located grooves 135. This indexing sprocket is interchangeable to suit the size of chain being processed.

Referring to punch assembly 69, this comprises a cylindrical shaft 142 mounted for lateral movement along axis 143 in a housing block 144, suitably bored at 145 and recessed at 146 to receive an alignment key 147. Block 144 is rigidly attached to platform 74. The inner end 148 of the shaft 143 is bored at 149 to receive two pins 150 and 151, spaced at a distance corresponding to the pitch of the chain. These pins slide in bores 152 and are so located as to be in alignment with roller chain pins 154. The outer end of shaft 142 is suitably and pivotally connected at 155 to a link 156, pivoted at 157 in bearing blocks 158, and further pivotally connected at 159 to piston rod 160 of actuating cylinder 161. A suitable recess 162 is cut in platform 74 to allow for the relative movement of link 156. Actuating cylinder 161 is connected to the frame of the machine as at 163. A sensing device 165 is mounted on face 120 of side plates 70 and 71 and generally comprises a support block 166, a rod 167 pivotally mounted at 168 at its upper end and mounting a contact roller 169 at its lower extremity. The rod 167 is spring-urged by means of a spring 169' to maintain a point contact between the lower face of the roller 169 and the upper face of the arcuate upper surface 170 of outer chain link 171. The uppermost extremity of rod 167 is suitably shaped to make or break contact with a microswitch 172, depending upon whether the roller 169 is in contact with the high or low portion of arcuate surface 170.

The chain itself is of conventional construction and comprises two outer links 171 and 173 of arcuate contour, each successive series of outer links being connected by inner links 174 and 175 at location of pins 154, the side pins 171, 173, 174 and 175 being maintained in space relationship by inner sleeve 176 and outer sleeve 177. Sideplate 70 is bored at 180, these bores being in alignment with bores 152 in sideplate 71 and with the pitch of the roller chain. A large recess 181 serves to receive the ejected pins after the punching operation.

Now to describe the operation of the machine. Controller 184 is set at a setting corresponding to the required number of links in the finished length of chain, while controller 185 is set to the required number of finished lengths. Upon actuation of the motor drive, the chain is fed from the chain spool 22 over guide sheave 47, idler sprocket 49 and drive sprocket 56 into the rectangular cavity and over indexing sprocket 137. The rotation of the indexing sprocket causes plunger 128 to ride laterally into and out of grooves 135. By transmitting this reciprocating action to microswitch 138 which in turn is connected back to control 184, a counting action is thereby achieved. When the correct number of grooves, which correspond to the required length of chain has been counted, the solenoid valve 110 is actuated downwardly, causing the tapered surface 106 of plunger assembly 90 to contact the outer sleeve 177 of roller chain. This action corresponds with the stopping of motor 63. The locking or wedging action thereby achieved has the effect of accurately positioning the pins 150 and 151, which are to be ejected and to lock the chain securely onto the indexing sprocket to prevent movement during the punching operation. Downward vertical movement of the solenoid actuates microswitch 190 mounted on support arms 115, which, in turn, causes the actuation of a four-way valve 191 and the resulting actuation of cylinder 161. Movement of the piston 160 of cylinder 161 causes the punch shaft 142 and ejecting pins 150 and 151 to move laterally and punch-out the pins 154 from the roller chain through the bores 180 and into recess 181. Innermost movement of the shaft 142 is restricted by contact with a microswitch 192 to automatically reverse the four-way valve to cause a retraction of the cylinder, until link 156 contacts microswitch 193. At this time, the solenoid valve 110 is de-energized allowing the cut chain to be withdrawn from the machine. As an aid to the correct alignment of the pins opposite bores 152 and 180, the sensing device causes an interruption in the energizing of the four-way valve to prevent the actuation of cylinder 161. Only when the roller is located at the "valley" of the arcuate surface is the four-way valve energized. Contact at any other point of the curve would not complete the circuit to the four-way valve.

FIG. 4 is believed to adequately illustrate and disclose the cooperative relationship and correlation of the various major elements of the apparatus, with the broken lines indicating diagrammatically electrical circuit control interrelationships between the various elements so that the operation of one element in response to, or in correlation with, another as a result of operation of various of the electrical switches and the corresponding opening or closing of corresponding electric circuit portions will function in the correlated manner described in the specification for the purposes of the present invention. In this connection, it should be noted that the broken line 194 connected from the controller 184 to the normally open switch 138, which effectively functions as a roller chain link counter in the manner hereinbefore described, is intended to indicate the correlation between the manually preset controller 184 and the combination switch and chain link counter 138 described hereinbefore and which, upon the counting by the switch-counter 138 of the number of chain links selected by the controller 184, effectively closes suitable electric circuit means whereby to energize the main chain locking solenoid 110—this effective coupling being diagrammatically indicated by the broken lines 195 in FIG. 4—and whereby to open suitable electric circuit means which previously had been energizing the main driving motor 63—this effective coupling being diagrammatically indicated by the broken line 196 in FIG. 4.

In other words, the showing of FIG. 4 with respect to the items 184, 138, 63, 110, and the broken electrical coupling lines 194, 185, and 196 is intended to disclose in diagrammatic fashion the arrangement previously physically described and clearly illustrated in the other figures of the drawings whereby the chain link counting switch 138 counts a number of chain links which has been selected by the initial setting of the controller 184 and, upon reaching the selected chain link count, energizes the main chain locking solenoid 110 and de-energizes the main chain driving motor 63.

The broken coupling line 197 is of a different type from the previously described broken coupling lines 194, 195, and 196, which indicate corresponding electrical circuitry, in that the coupling line 197 indicates a mechanical driving connection between the main chain driving motor 63 and the main chain driving sprocket 56 which engages the chain 23. A similar type of mechanical coupling is also indicated by the broken line 198 of FIG. 4 which merely indicates the mechanical operation of the counting switch 138 as a result of rotation of the counting sprocket 137 which counts the chain links of the chain passing thereover. In other words, both the broken lines 197 and 198 designate in diagrammatic fashion mechanical coupling links, while the broken lines 194, 195, and 196 designate in diagrammatic fashion electrical coupling links between the elements connected thereto.

The energization of the main chain locking solenoid 110 in the manner just described of course vertically downwardly moves the chain locking plunger assembly 90 of FIG. 4 and locks the chain 23, shown diagrammatically in broken lines in FIG. 4, in the manner shown physically in FIG. 7. This causes operation of the two-position, snap-action switch 190 of FIG. 4, which then, by way of the broken line 199, which indicates in diagrammatic form appropriate electrical circuitry, causes operation of the four-way valve means 191 in a direction such as to put high pressure into the pneumatic (or hydraulic) line indicated diagrammatically at 200 in FIG. 4 and such as to put low pressure into the pneumatic (or hydraulic) line 201 in FIG. 4, which, thus, causes the actuator or cylinder 161 to extend the rod 160 toward the right as viewed in FIG. 4, which pivots the link 156 around the pivot pin 157 in a counterclockwise manner, which thus forcibly drives the punch shaft 142 toward the left as viewed diagrammatically in FIG. 4 and as viewed physically and in more mechanical detail in FIG. 5 whereby to punch out the corresponding pair of chain link pins 154 in the manner previously described in considerable detail.

Counterclockwise movement of the link 156 at the end of the leftward stroke of the shaft 142 as just described will strike the two-position, snap-action switch 192, which is shown coupled by the broken line 202 (which diagrammatically designates corresponding electrical circuitry), to the previously mentioned four-way valve means 191 in a manner which positionally reverses the four-way valve means 191 so as to now place high pressure on the pneumatic or hydraulic duct or line 201 and to correspondingly place low pressure on the other pneumatic or hydraulic duct or line 200, which will, of course, cause immediate retraction of the rod 160 which will cause the link 156 to pivot around the pivot pin 157 in a clockwise direction, which will withdraw the punch shaft 142, or move it toward the right as viewed in FIG. 4 in diagrammatic form and as viewed in physical form in FIG. 5.

Such clockwise movement of the link 156 will cause it to strike the other multiple-element, position-reversing, snap-action switch 193, which is shown coupled by the broken line 203 (which diagrammatically designates corresponding electrical circuitry), to the previously mentioned four-way valve means 191 in a manner which places it in neutral position such that neither high pressure nor low pressure is applied to either of the pneumatic ducts or lines 202 and 201, but they are both effectively closed within the four-way valve means, thus effectively locking the actuator or cylinder 161 in the fully retracted position.

The switch 193 is also shown coupled by the optional broken coupling line 204 (which diagrammatically indicates corresponding electrical circuitry), to the previously mentioned chain locking solenoid 110 in a manner which effectively de-energizes same and resets it for the next operation by the cooperation of the counting switch 138 and the hand-set controller 184 as previously described. It should be clearly understood that this is an optional arrangement as an alternate to an arrangement where the controller 184, under the control of counting switch 138, de-energizes the motor 63 and energizes the solenoid 110, only long enough (by the use of time delay relay means) to allow the punch-out operation to be completed, after which the solenoid 110 is automatically de-energized and the motor 63 is re-energized by the controller 184 and the previously described operating cycle is again repeated.

The previously mentioned sensing means 165, shown physically in FIG. 6 and diagrammatically in FIG. 4, includes the roller 169 on the pivoted follower rod 167, which roller 169 rolls along the top surface of the roller chain 23 and is correspondingly moved upwardly or downwardly by the contoured surface thereof and, when moved downwardly by valleys in the contoured surface of the chain 23, allows the normally closed switch means 172 to remain in closed condition, but when moved upwardly by the enlargements along the top surface of the roller chain 23, effectively opens the switch 172, which is shown diagrammatically coupled by the broken coupling line 205 (which indicates corresponding electrical circuitry), to the previously mentioned electrical coupling line 199, which couples the switch 190 and the four-way valve 191.

The arrangement illustrated is intended to indicate that when the switch 172 is open as it is whenever the roller 169 abuts the chain 23 anywhere except in a chain valley, the electrical coupling line 199 is also effectively open and incapable of operating the four-way valve means 191 whereby to cause the leftward forcible movement of the punch shaft 142 by reason of extension of the actuator 161 as previously described. In other words, the sensing means 165, comprising the upper chain surface following roller 169, the rod 167, and the switch 172 effectively comprise an inactivating means for inactivating the four-way valve means 191 by opening the energizing circuit thereto until such time as the roller 169 lies in a valley of the top surface of the roller chain 23, such as is clearly shown physically in FIG. 6. This corresponds to exact alignment of the pair of punch pins 151 with the rivets or pins 154 of the roller chain 23.

It should also be noted that the broken electrical coupling line indicated diagrammatically at 205 may, in certain forms of the invention, also be connected to the previously mentioned electrical coupling line 195 whereby to prevent actuation of the chain locking solenoid 110 in addition to preventing operation of the four-way valve means 191 until such time as the roller 169 of the sensing means 165 lies in one of the valleys along the top surface of the roller chain 23, of course accompanied by the proper total chain link count by the counting switch 138 and the correlation thereof with the manually preset chain link count controller 184 in the manner previously described.

With respect to the manually preset, selectively operable chain link count controller 184, it should be noted that this is a conventional type of controller well known in the art and, therefore, is not disclosed in detail. Furthermore, it does not touch upon the real inventive concept of the present invention. It should suffice to say that one such well known controller which may be used for this purpose is that manufactured by the Bliss Eagle Signal Company (a division of E. W. Bliss Co.) of 736 Federal Street, Davenport, Iowa, and known as the "Microflex Reset Counter."

The controller 185 is shown diagrammatically coupled by the coupling line 206 to the controller 184 and is merely a separated chain length unit counter which effectively counts each time the chain locking solenoid 110, the punch shaft 142, and the motor 63 are correspondingly operated and/or stopped, respectively, in correspondence with the striking out of a pair of pins 154 of the chain 23 and the consequent separation of the free end of the roller chain 23 from the remainder thereof. Such a controller is merely a correlation-type counter similar in principle to the correlation-type counter 184 previously described in some detail and functioning in the present invention as a counter for individual links of the chain 23, and it is a conventional item available from various manufacturers and is not described in detail for the same reasons as referred to hereinbefore in connection with the controller 184. However, for purposes of providing an adequate disclosure, it should suffice to say that one such well known controller which may be used for this purpose is that manufactured by Veeder-Root, Incorporated of Hartford, Conn., and known as a small "Predetermining Magnetic Counter."

I claim:

1. A machine for disassembling a riveted roller chain automatically, comprising: an aperture to guide roller chain links in such a way as to substantially prevent lateral and vertical motion; a pair of pins movable at right angles to said aperture; an indexing sprocket located in said aperture, said sprocket being caused to rotate by motion of said chain through said aperture, said indexing sprocket being equipped with counter-operating means positioned in a predetermined manner with respect to each sprocket tooth; a counter associated with the counter-operating means of said sprocket; sensor means for determining the proper position of the roller chain links over said sprocket; and means to actuate said pair of pins to disconnect the roller chain when a predetermined number of chain links have been counted by said counter and when said sensor means indicates that the chain is properly positioned over said indexing sprocket.

2. A machine for disassembling a riveted roller chain automatically, comprising: an aperture to guide roller chain links in such a way as to prevent lateral and vertical motion; a pair of pins movable at right angles to said aperture; an indexing sprocket located in said aperture, said sprocket being caused to rotate by motion of said chain through said aperture, said indexing sprocket being equipped with a radial groove exactly centered on each sprocket tooth; a counter associated with the grooves of said sprocket; sensor means for determining the proper position of the roller chain links over said sprocket; and means to actuate said pair of pins to disconnect the roller chain when a predetermined number of chain links have been counted by said counter and when said sensor means indicates that the chain is properly positioned over said indexing sprocket.

References Cited

UNITED STATES PATENTS

| | | | |
|---|---|---|---|
| 2,499,336 | 2/1950 | Teerlink | 59—7 |
| 3,003,306 | 10/1961 | Quisenberry | 59—7 |
| 3,075,347 | 1/1963 | Bonifas | 59—7 |
| 3,099,130 | 7/1963 | Pahl | 59—7 |
| 3,191,376 | 1/1965 | Morin | 59—8 |

CHARLES W. LANHAM, *Primary Examiner.*

G. P. CROSBY, *Assistant Examiner.*